United States Patent
Glime

(10) Patent No.: US 7,370,664 B2
(45) Date of Patent: May 13, 2008

(54) FLOW CONTROL DEVICE

(75) Inventor: William H. Glime, Painesville, OH (US)

(73) Assignee: Swagelok Company, Solon, OH (US)

( * ) Notice: Subject to any disclaimer, the term of this patent is extended or adjusted under 35 U.S.C. 154(b) by 0 days.

(21) Appl. No.: 11/343,105

(22) Filed: Jan. 30, 2006

(65) Prior Publication Data

US 2006/0169941 A1 Aug. 3, 2006

Related U.S. Application Data

(60) Provisional application No. 60/648,543, filed on Jan. 31, 2005.

(51) Int. Cl.
*F16K 7/00* (2006.01)
(52) U.S. Cl. .................. 137/375; 251/331; 251/364
(58) Field of Classification Search .............. 251/331, 251/335.2, 364, 900; 137/375
See application file for complete search history.

(56) References Cited

U.S. PATENT DOCUMENTS

| | | | | |
|---|---|---|---|---|
| 2,644,664 A | * | 7/1953 | Hansen ................. | 137/375 |
| 3,198,481 A | * | 8/1965 | Bryant ................. | 251/900 |
| 3,349,795 A | * | 10/1967 | Matsutani ............ | 137/375 |
| 3,511,260 A | * | 5/1970 | Benjamin ............. | 251/364 |
| 3,982,559 A | * | 9/1976 | Ochs ................... | 251/331 |
| 4,596,268 A | * | 6/1986 | Jonas .................. | 137/375 |
| 4,634,093 A | * | 1/1987 | Schintgen ............ | 251/82 |
| 5,186,434 A | * | 2/1993 | Nishimura et al. .. | 251/331 |
| 5,368,064 A | * | 11/1994 | Kjaer ................... | 137/375 |
| 5,413,311 A | * | 5/1995 | Arstein et al. ....... | 251/331 |
| 5,924,441 A | * | 7/1999 | Leys et al. ........... | 251/335.2 |
| 6,629,682 B2 | * | 10/2003 | Duelli ................. | 251/364 |
| 2004/0000843 A1 | * | 1/2004 | East .................... | 310/331 |
| 2006/0175573 A1 | * | 8/2006 | Ohmi et al. .......... | 251/331 |

FOREIGN PATENT DOCUMENTS

| | | |
|---|---|---|
| GB | 321 892 | 11/1929 |
| JP | 2002-323147 | 11/2002 |
| WO | WO 2004/074722 | 9/1994 |
| WO | WO 95/23936 | 9/1995 |
| WO | WO 2004/092622 | 10/2004 |

OTHER PUBLICATIONS

International Search Report from PCT/US2006/003271.

* cited by examiner

*Primary Examiner*—John Bastianelli
(74) *Attorney, Agent, or Firm*—Calfee, Halter & Griswold LLP

(57) ABSTRACT

A flow control device having a control member for forming a seal with another part of the flow control device. The control member having a base material and a portion or surface that is a softer or more deformable than the base material or the portion of the control device that the control member forms a seal with. The differences in hardness and/or the ability of the control member portion to deform, aids in forming the seal.

26 Claims, 4 Drawing Sheets

FLOW CONTROL DEVICE

RELATED APPLICATIONS

This application claims the benefit of U.S. provisional patent application Ser. No. 60/648,543 for COATED VALVE DIAPHRAGM filed Jan. 31, 2005, the entire disclosure of which is fully incorporated herein by reference.

BACKGROUND OF THE INVENTION

Diaphragm valves are a type of flow control device. Existing diaphragm valves include a valve body and a dome shaped diaphragm. A seal is provided between the diaphragm and the valve body at or near the outer peripheral area of the diaphragm. A bonnet may be used to clamp the diaphragm to the valve body to provide the seal between the valve body and the diaphragm. In order to achieve a satisfactory seal, high compressive forces may be needed, especially where imperfections in the valve body and diaphragm surfaces exist and where the diaphragm is made of harder materials.

The valve body typically includes a passageway between the inlet and the outlet of the valve. An actuator is typically employed to flex the diaphragm into engagement with a valve seat to seal off the passageway when desired. Forming a satisfactory seal between the diaphragm and valve seat is important to the performance of the valve.

SUMMARY OF THE INVENTION

The present application relates to a flow control device having a control member that forms a seal with another part of the flow control device, such as for example, a body portion or a seat area. The control member may include a portion or surface that is a softer or more deformable than the rest of the control member or than a portion of the control device that the control member forms a seal with. The differences in hardness and/or the ability of the control member portion to deform, aids in forming the seal. As a result, the amount of force needed to form a satisfactory seal may be less that what is needed if the softer, more deformable portion of the control member is not present.

In one embodiment, the flow control device is a diaphragm-style valve that includes an inlet port, an outlet port, and a valve seat. The flow control device includes a control member in the form of a coated, flexible member or diaphragm configured for sealing engagement with the valve seat. The coating may be disposed on the flexible member for sealing an interface between the flexible member and the valve seat and/or between the flexible member and a valve body.

BRIEF DESCRIPTION OF THE DRAWINGS

In the accompanying drawings, which are incorporated in and constitute a part of this specification, an embodiment of the invention is illustrated, which, together with a general description of the invention given above, and the detailed description given below, serve to illustrate the principles of this invention.

DETAILED DESCRIPTION

Figure 1:
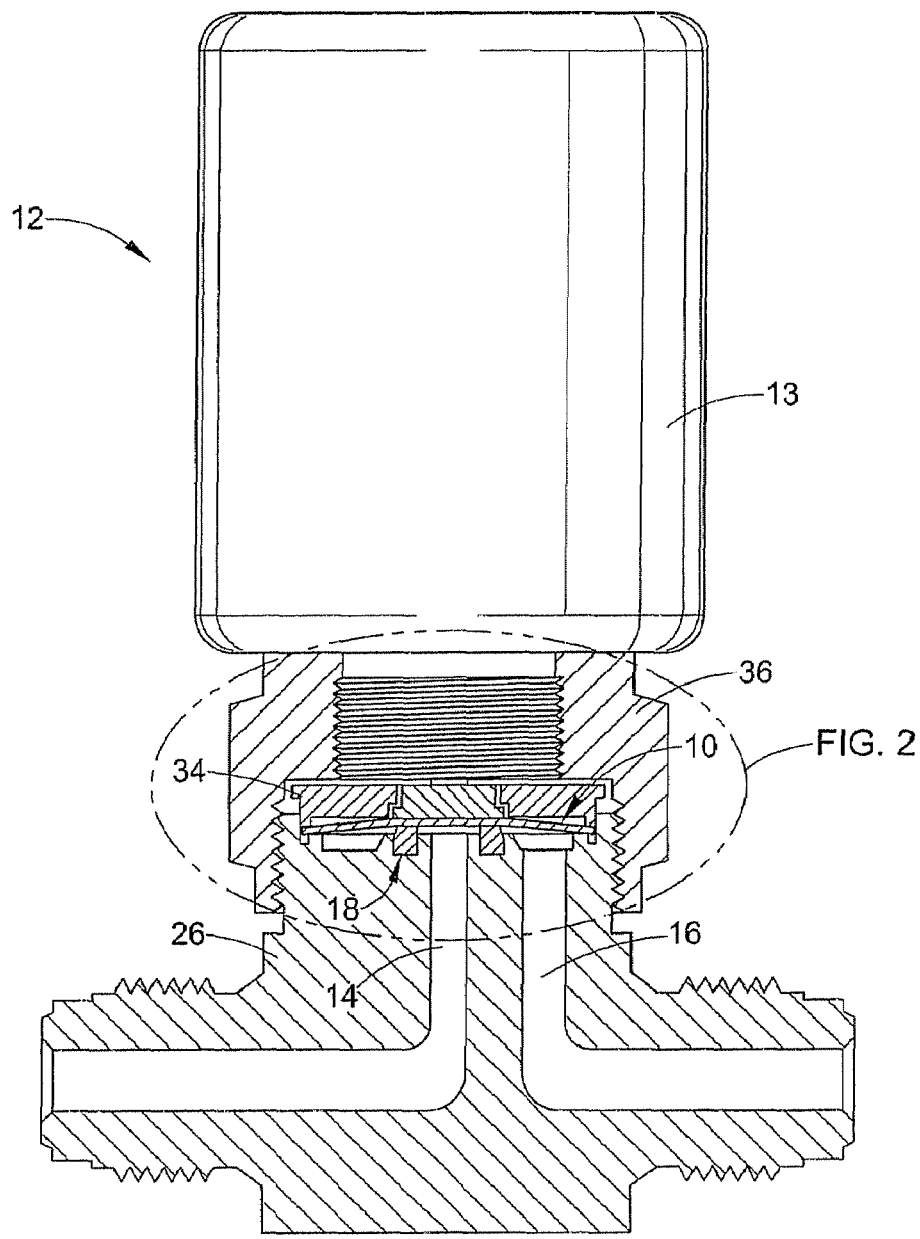
FIG. 1 is an illustration of a diaphragm valve assembled with a pneumatic actuator.

While various aspects and concepts of the invention are described and illustrated herein as embodied in combination in the exemplary embodiments, these various aspects and concepts may be realized in many alternative embodiments, either individually or in various combinations and sub-combinations thereof. Unless expressly excluded herein all such combinations and sub-combinations are intended to be within the scope of the present invention. Still further, while various alternative embodiments as to the various aspects and features of the invention, such as alternative materials, structures, configurations, methods, devices, software, hardware, control logic and so on may be described herein, such descriptions are not intended to be a complete or exhaustive list of available alternative embodiments, whether presently known or identified herein as conventional or standard or later developed. Those skilled in the art may readily adopt one or more of the aspects, concepts or features of the invention into additional embodiments within the scope of the present invention even if such embodiments are not expressly disclosed herein. Additionally, even though some features, concepts or aspects of the invention may be described herein as being a preferred arrangement or method, such description is not intended to suggest that such feature is required or necessary unless expressly so stated. Still further, exemplary or representative values and ranges may be included to assist in understanding the present invention however, such values and ranges are not to be construed in a limiting sense and are intended to be critical values or ranges only if so expressly stated.

The present invention contemplates a flow control device that includes a control member for forming a seal with another part or portion of the flow control device. In order to facilitate a satisfactory seal, the control member may be, or may include a portion or surface, that is softer or more deformable than the base material of the control member or the portion of the flow control device to which the control member seals. The softer material of the control member more readily conforms to surface of the flow control device, thus requiring less force to form a satisfactory seal.

The flow control device may be, for example, a regulator or a diaphragm valve. The control member may be, for example, a flexible member, such as a diaphragm, or some other surface adapted to form a sealing interface with a portion of the flow control device. For example, the control member may form a sealing interface with a seat surface or a body portion of the flow control device. A softer portion or surface of the control member may be achieved in a variety of ways. For example, a coating may be applied to the base material of the control member or an softer insert may be attached or affixed to the base material. In addition, a portion of the base material of the control member may be configured to be softer through surface modification, such as for example, making the surface more porous, locally annealing the surface, or some other reaction or modification to achieve a softer or more deformable/elastic surface condition.

Referring to the exemplary embodiment of FIG. 1, a coated flexible member 10 is used in a valve arrangement 12 that includes a pneumatic actuator 13, an inlet port 14, an outlet port 16, and a valve seat 18. The coated flexible member 10 in the exemplary embodiment of FIG. 1 is realized in the form of a diaphragm for providing a sealing engagement with the valve seat 18. It should be readily apparent that the illustrated inlet port 14 could function as an outlet port and the illustrated outlet port 16 could function as an inlet port. Furthermore, it should be readily apparent, that the diaphragm 10 could be used in a variety of different types of valve arrangements, such as for example, but not limited to, manually actuated valve arrangements, electrically actuated valve arrangements, and normally open or normally closed valve arrangements.

In the exemplary embodiment of FIG. 1, the diaphragm 10 comprises a flexible metallic member 20 or substrate. A coating 22 is disposed on the flexible metallic member (see FIGS. 4A and 4B) to aid in sealing an interface between the diaphragm 10 and the valve seat 18 and/or an interface between the diaphragm and a valve body 26.

Figure 2A:
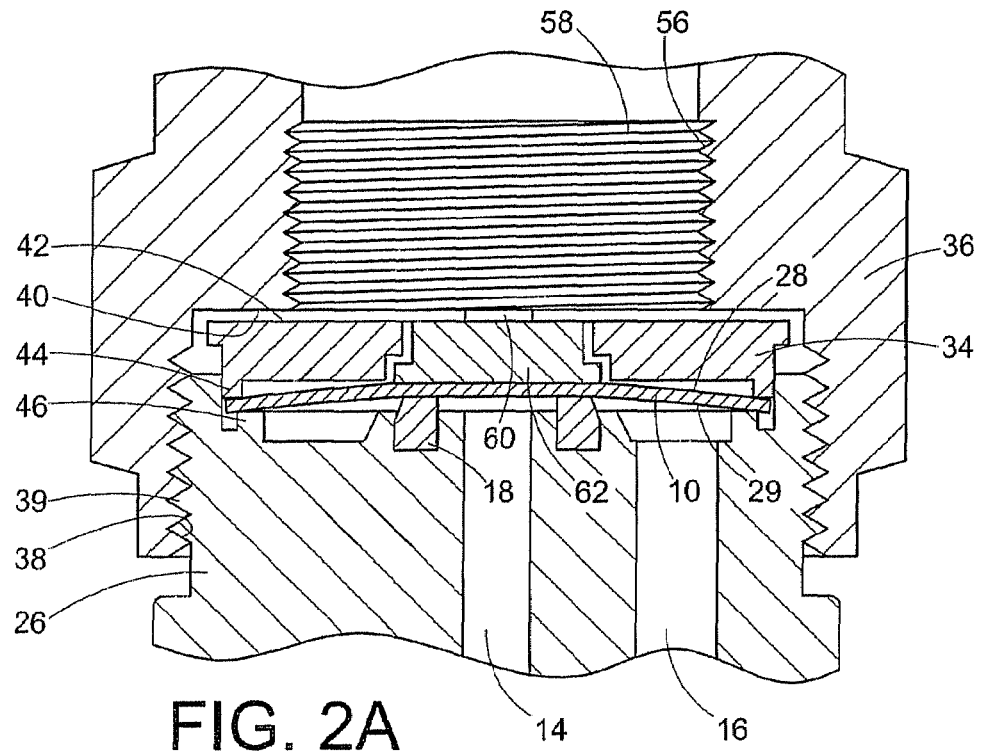
FIG. 2A is an enlarged view showing the portion of FIG. 1 that is identified by the reference FIG. 2.

In the embodiment illustrated by FIG. 2A, the valve seat 18 is a separate annular seat member that is assembled with the valve body 26. The separate annular seat member 18 may be a plastic member, a metallic member, an annular metallic member that includes a thin polymer coating, or other suitable material(s). The thin polymer coating may be formed from the same materials as the coating 22 on the diaphragm 10. In one embodiment of the diaphragm valve arrangement 12, the valve seat 18 includes the coating 22 and the diaphragm 10 does not includes the coating in the area of contact with the valve seat.

Figure 2B:
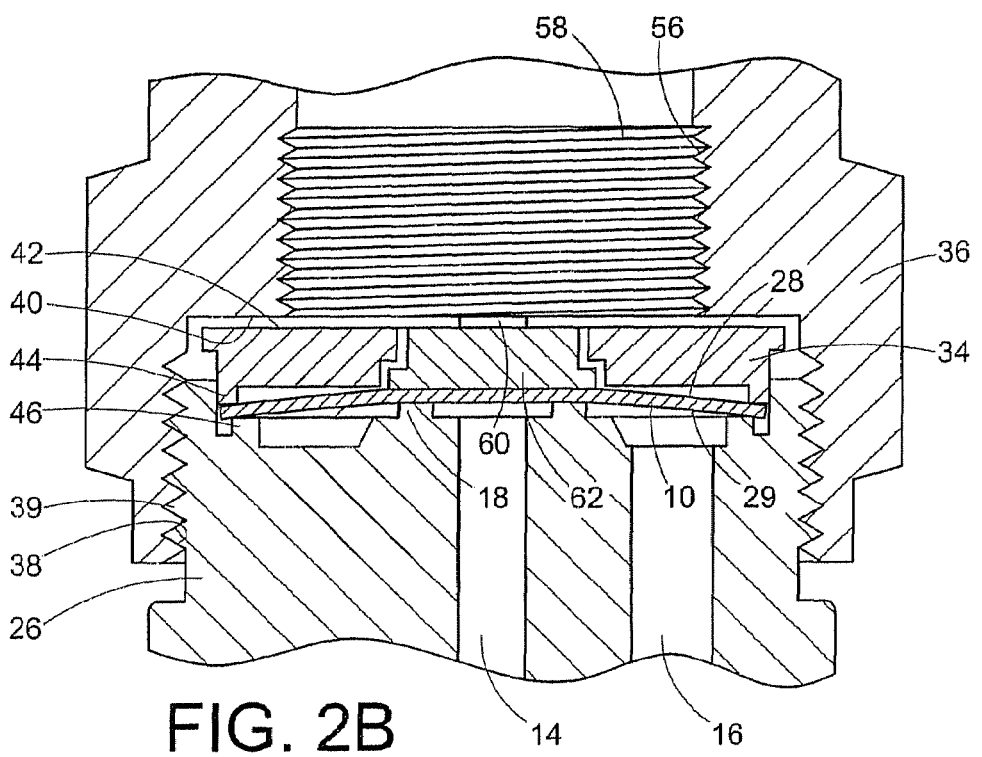
FIG. 2B is a view similar to the view of FIG. 2A showing the valve body that includes an integral valve seat.
Figure 3:
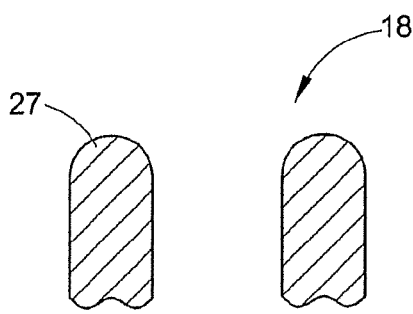
FIG. 3 is a cross-sectional view of a valve seat.

In the embodiment illustrated by FIG. 2B, the valve seat 18 is integrally formed with the valve body 26. For example, the valve body 26 may be a metallic member and the valve seat 18 may be a metallic portion of the valve body. The valve seat 18 may be configured in a variety of ways. For example, FIG. 3 illustrates one possible valve seat configuration. In the example of FIG. 3, the integral valve seat 18 has a rounded annular bead cross-section 27.

Referring to the exemplary embodiment of FIGS. 1, 2A, and 2B, the diaphragm 10 is assembled with the valve body 26 to flex into sealing engagement with the valve seat 18 and out of engagement with the valve seat. When assembled, the diaphragm 10 has an actuator side 28 and a valve seat side 29. The valve body 26 and the diaphragm 10 define a flow path from the inlet port 14 to the outlet port 16 when the diaphragm is not flexed, thus allowing process fluid to flow from the inlet port 14 to the outlet port 16. The pneumatic actuator 13 is assembled with the valve body 26 and diaphragm 10 for selectively flexing the diaphragm into and out of engagement with the valve seat 18. When the diaphragm 10 is flexed into engagement with the valve seat 18, the coating 22 contacts and seals with the valve seat.

In the illustrated example, a bonnet 34 secures the diaphragm 10 to the valve body 26 and a bonnet nut 36 clamps the bonnet 34 and diaphragm 10 to the valve body 26. By including the coating 22 on the diaphragm 10 in the area where the valve body 26 engages the periphery of the diaphragm 10, the amount of force required to properly seal the diaphragm 10 to the valve body 26 is reduced. In addition, the range of acceptable forces that will properly seal the diaphragm 10 with the valve body 26 is broadened. The illustrated bonnet nut 36 includes internal threads 38 that engage outer threads 39 of the valve body 26. A clamping surface 40 of the bonnet nut 36 engages an end surface 42 of the bonnet 34 to force the bonnet toward the valve body 26. In the illustrated embodiment, an annular ridge 44 on the bonnet 34 and an annular ridge 46 on the valve body 26 clamp the outer periphery of the diaphragm 10 to form a seal between the outer periphery of the diaphragm 10 and the valve body 26. The coating 22 on the periphery of the diaphragm 10 acts as a seal between the diaphragm flexible metallic member 20 or substrate and the valve body 26.

In the example illustrated by FIGS. 1, 2A, and 2B, the actuator 13 is assembled to the valve assembly 12 by the bonnet nut 36. The illustrated bonnet nut 36 includes internal threads 56 that engage external threads 58 of the actuator 13. The actuator 13 selectively extends an actuator rod 60 to move a button 62 along a path of travel defined by the bonnet 34. When the rod 60 is extended, the button 62 deflects the diaphragm 10 into sealing engagement with the valve seat 18. When the rod 60 is retracted, the diaphragm 10 flexes away from the valve seat 18 to open the flowpath between the inlet port 14 and outlet port 16.

Figure 4A:
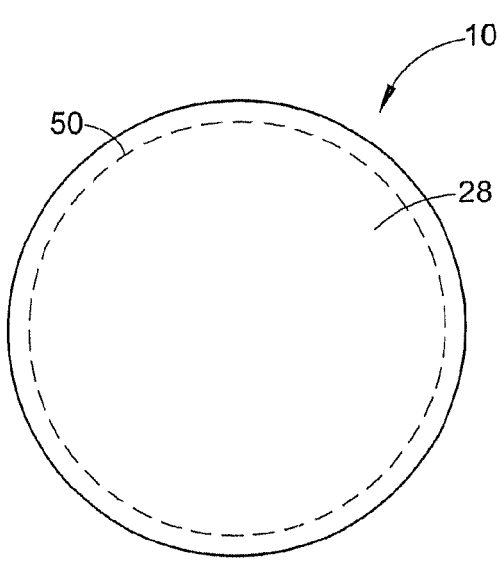
FIG. 4A is a schematic illustration of a diaphragm showing contact areas on an actuator side of the diaphragm.

FIG. 4A schematically illustrates where the bonnet annular ridge 44 engages the diaphragm 10 when the valve arrangement 12 is assembled. Phantom line 50 illustrates the contact location of the bonnet annular ridge 44 on the actuator side 28 of the diaphragm 10. The bonnet annular ridge 44 may contact the diaphragm 10 along the phantom line 50 or may contact an area of the diaphragm 10, such as for example, the area on the diaphragm 10 between the phantom line 50 and the outer edge of the diaphragm.

Figure 4B:
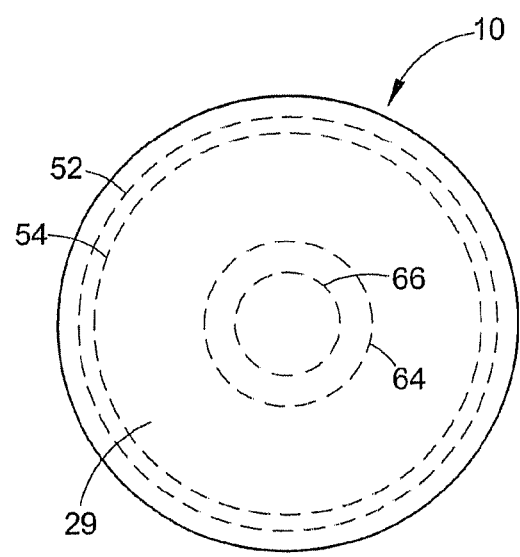
FIG. 4B is a schematic illustration of a diaphragm showing contact areas on a valve seat side of the diaphragm.

FIG. 4B schematically illustrates where the valve body annular ridge 46 and where the valve seat 18 engage the valve seat side 29 of the diaphragm 10 when the valve arrangement 12 is assembled. Phantom lines 52, 54 illustrate the contact location of the valve body annular ridge 46 on the diaphragm 10 and phantom lines 64, 66 illustrate the contact location of the valve seat 18 engages diaphragm 10. Both the valve body annular ridge 46 and the valve seat 18 may contact the diaphragm 10 along the respective phantom lines or may contact an area of the diaphragm 10.

Figure 5A:
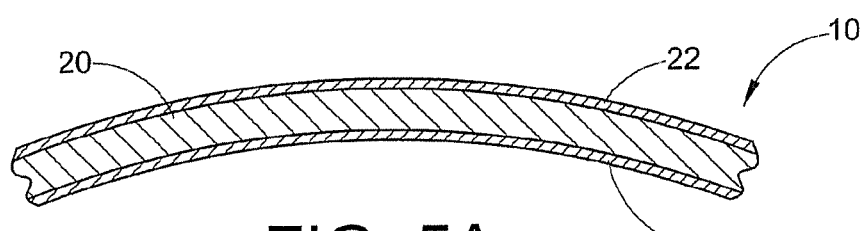
FIG. 5A is an enlarged view of the portion of FIG. 2 identified by the reference FIG. 5A illustrating a diaphragm with a coating disposed on both sides of the diaphragm.
Figure 5B:
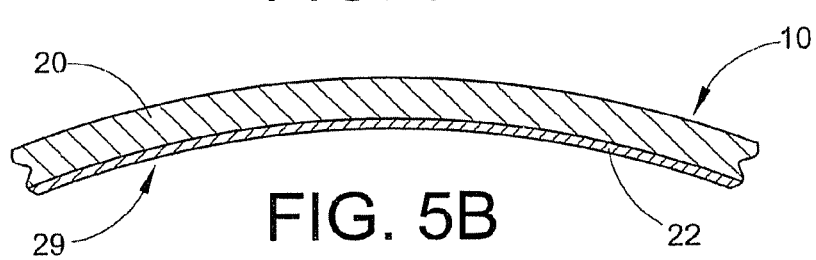
FIG. 5B is a schematic illustration of a diaphragm with a coating disposed on a valve seat side of the diaphragm.

The coating 22 on the diaphragm 10 may be applied to one or both sides of the diaphragm 10. In the example illustrated by FIG. 5A, the coating 22 is disposed on both sides of the base material 20. In the example illustrated by FIG. 5B, the coating 22 is disposed only on the valve seat side 29 of the diaphragm 10.

The coating 22 on the diaphragm 10 may be a wide variety of different materials which may aid in sealing the interface between the diaphragm 10 and the valve seat 18 and/or valve body 26, may sufficiently adhere or bond to the base material, and may be sufficiently temperature and chemically compatible to the valve arrangement's application. In an exemplary embodiment, the coating 22 on the diaphragm 10 comprises a fluoropolymer material, such as polytetrafluoroethylene (PTFE), perfluoroalkoxy (PFA), or perfluoroelastomer, such as for example, KALREZ®. A fluoropolymer material coating 22 facilitates a high-integrity seal with a low required actuator force.

In the exemplary embodiment, the coating parameters are selected to enable the diaphragm valve arrangement 12 to operate in a wide range of environments. A thin coating allows the valve arrangement 12 to operate in an environment with a temperature up to and possibly exceeding approximately 300 degrees C. In one embodiment, the coating is less than 0.001" thick. The coating 22 may be applied to the diaphragm 10, such that the coating will permanently adhere to the diaphragm surface. Existing fluoropolymer coating techniques, such as the techniques used to apply fluoropolymers to non-stick pans, may be used to apply the coating 22 to the metal diaphragm 10.

Figure 6A:
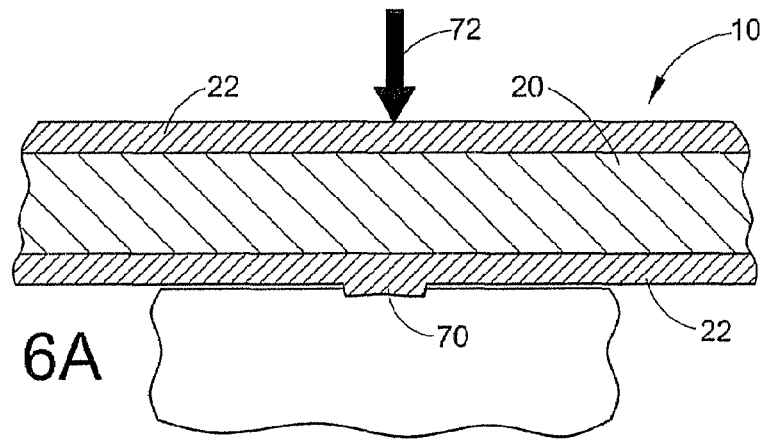
FIG. 6A is a schematic illustration that shows a coating on a diaphragm filling an imperfection in a valve member.
Figure 6B:
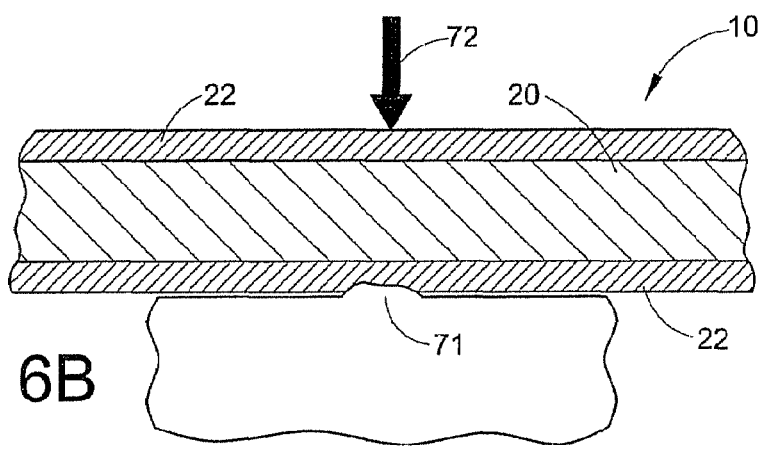
FIG. 6B is a schematic illustration that shows a coating on a diaphragm conforming to an imperfection in a valve member.

Referring to FIGS. 6A and 6B, the coating 22 facilitates a high integrity seal between the diaphragm 10 and the valve body 26 and/or the diaphragm and the valve seat 18 (which may be integrally formed with the valve body), even when the surfaces of the diaphragm, the valve body and/or the valve seat include imperfections. Examples of imperfections include voids 70 (FIG. 6A), such as for example, scratches, and bumps 71 (FIG. 6B). In the examples illustrated by FIGS. 6A and 6B, the valve seat 18, valve body 26, bonnet 34, or the diaphragm member 18 itself may include an imperfection, such as a void 70 or a bump 71. When a force (indicated by arrow 72) is applied to the diaphragm 10, the softer coating 22 fills the void 70 or conforms around the bump 71 to thereby inhibit leakage. As a result, a metallic valve body 26 that includes an integrally formed valve seat 18 may be used with a low actuation force actuator. In addition, with an integrally formed seat, no secondary operations are required to connect a seat 18 to the valve body 26.

Figure 7:
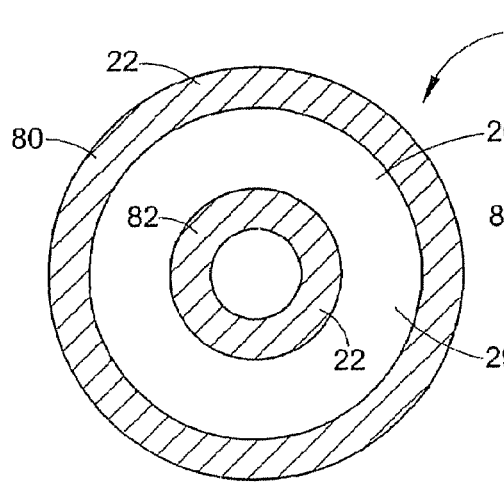
FIG. 7 is a schematic illustration of a coating pattern on the valve seat side of a diaphragm.
Figure 8:
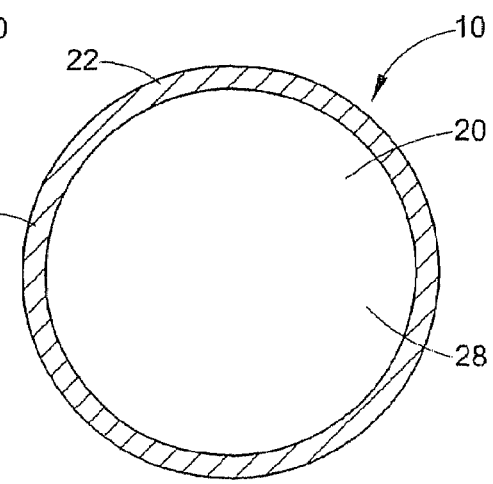
FIG. 8 is a schematic illustration of a coating pattern on the actuator side of a diaphragm.

The coating 22 may be applied to the entire actuator side 28 and/or the entire valve seat side 29 of the diaphragm 10 or the coating may be applied in a pattern to one or both sides of the diaphragm. In the example of FIGS. 7 and 8, a pattern of coating 22 is applied to the diaphragm 10 generally only in areas where a seal is formed by the diaphragm 10 with the valve body 26, the valve seat 18, and the bonnet 34 (as illustrated in FIGS. 4A and 4B). It should be readily apparent, that the coating 22 may be applied in any pattern desired, such as for example, to generally match the sealing areas of valve arrangements with various configurations.

The coating 22 may also be applied in a buffer region surrounding the areas where a seal is formed. By limiting the area where the coating 22 is applied to the diaphragm 10, wetting of the coating by fluid that flows through the valve arrangement 12 is reduced. In the example of FIG. 7, an outer ring 80 of coating 22 is applied to the valve seat side 29 of the diaphragm 10. The illustrated outer ring 80 of coating covers the area (illustrated by phantom lines 52, 54 in FIG. 4B) of the diaphragm 10 where the valve body annular ridge 46 engages the diaphragm. In the illustrated embodiment, the outer ring 80 is wider than the area where the valve body 26 engages the diaphragm 10 to ensure proper sealing even if alignment of the diaphragm and the valve body is not precise. In one embodiment, the outer ring 80 is sized to be the same width, or slightly narrower than the area where the valve body annular ridge 46 engages the diaphragm 10. In this embodiment, wetting of the outer ring 80 of the coating 22 by process fluid is substantially eliminated.

In the example of FIG. 7, an inner ring 82 of coating 22 is applied to the valve seat side 29 of the diaphragm 10. The illustrated inner ring 82 of coating covers the area (illustrated by phantom lines 64, 66 in FIG. 4B) of the diaphragm 10 where the valve seat 18 engages the diaphragm. In the illustrated embodiment, the inner ring 82 is wider than the area where the valve seat 18 engages the diaphragm 10 to ensure proper sealing even if alignment of the diaphragm and the valve seat is not precise. In one embodiment, the inner ring 82 is sized to be the same width, or slightly narrower than the area where the valve seat 18 engages the diaphragm 10. In this embodiment, wetting of the inner ring 82 of the coating 22 by process fluid when the diaphragm valve is closed is substantially eliminated.

In the example of FIG. 8, a ring 88 of coating is applied to the actuator side 28 of the diaphragm 10. The illustrated ring 88 of coating 22 covers the area (illustrated by phantom line 50 in FIG. 6) of the diaphragm 10 where the bonnet 34 engages the diaphragm. In the illustrated embodiment, the ring 88 is wider than the area where the bonnet 34 engages the diaphragm 10 to ensure proper sealing even if alignment of the diaphragm and the bonnet is not precise. In one embodiment, the ring 88 of coating 22 is sized to be the same width, or slightly narrower than the area where the bonnet 34 engages the diaphragm.

By patterning the coating 22 on the diaphragm 10 only in areas where a seal is formed between the diaphragm 10 and another member, the potential for particle generation and the overall surface area of polymer coating exposed to process fluid is reduced. Reducing the exposed coating surface area reduces the amount of process fluid that could potentially be absorbed by the coating 22 and thereby reduces the possibility that purge performance will be compromised by using a coated diaphragm 10.

In one exemplary embodiment, the valve body 26 comprises a metallic member, the valve seat 18 is an integrally formed metallic portion of the valve body 26, the diaphragm 10 comprises a metallic member, and the coating 22 comprises a polymer, such as fluoropolymer material. In this embodiment, the coating 22 acts as a seal between the metallic valve seat 18 and/or the metallic valve body 26. If the seal provided by the diaphragm coating 22 is damaged, for example, by contamination or an environmental problem, the diaphragm 10 can be easily removed and replaced with a new coated diaphragm that provides a fresh seal. The inclusion of an integrally formed metallic seat 18 allows for an increased flow of process fluid as compared with valve bodies that include staked-in plastic valve seats. The flow is higher with an integral seat, because the combination of the structure needed to stake-in the valve seat and the valve seat itself is larger than an integral valve seat and the valve porting can thus be made larger for a given valve body size.

The invention has been described with reference to the preferred embodiments. Modification and alterations will occur to others upon a reading and understanding of this specification. It is intended to include all such modifications and alterations insofar as they come within the scope of the appended claims or the equivalents thereof.

The invention claimed is:

1. A diaphragm valve comprising:
  a valve body including an inlet port, an outlet port, and a valve seat; and
  a diaphragm assembled with the valve body, the diaphragm being configured to flex into sealing engagement with the valve seat to inhibit fluid flow from the inlet port to the outlet port and out of sealing engagement with the valve seat to allow fluid flow from the inlet port to the outlet port, the diaphragm including a coating disposed on the diaphragm in a pattern comprising an outer ring of coating on the diaphragm and an uncoated area of the diaphragm that extends radially inward from the outer ring;

wherein the pattern further comprises an inner ring of coating on the diaphragm that is spaced apart from the outer ring of coating by the uncoated area of the diaphragm that extends radially inward from the outer ring to the inner ring, wherein the pattern further comprises a second uncoated area of the diaphragm that extends radially inward from the inner ring.

2. The diaphragm valve of claim 1 wherein the coating comprises a fluoropolymer material.

3. The diaphragm valve of claim 1 wherein the coating comprises polytetrafluoroethylene.

4. The diaphragm valve of claim 1 wherein the diaphragm comprises a metallic member and the coating comprises a fluoropolymer material.

5. The diaphragm valve of claim 1 wherein the valve body comprises a metallic member, the valve seat is integrally formed with the valve body, the diaphragm comprises a metallic member, and the coating comprises a fluoropolymer material.

6. The diaphragm valve of claim 1 wherein the coating is applied to both sides of the diaphragm.

7. The diaphragm valve of claim 1 wherein the outer ring of coating defined by the pattern generally matches the area where the diaphragm forms a seal with the valve body.

8. A diaphragm for use in a flow control device that includes a body having an inlet port, an outlet port, and a valve seat, the diaphragm comprising:
   a flexible metallic member; and
   a non-metallic coating disposed on the flexible metallic member for sealing an interface between the diaphragm and the body; wherein the coating is disposed on the flexible metallic member in a pattern comprising an outer ring of coating on the flexible metallic member and an uncoated area of the flexible metallic member that extends radially inward from the outer ring;
   wherein the pattern further comprises an inner ring of coating on the flexible metallic member that is spaced apart from the outer ring of coating by the uncoated area of the flexible metallic member that extends radially inward from the outer ring to the inner ring, wherein the pattern further comprises a second uncoated area of the flexible metallic member that extends radially inward from the inner ring.

9. The diaphragm of claim 8 wherein the coating comprises a fluoropolymer material.

10. The diaphragm of claim 8 wherein the coating comprises polytetrafluoroethylene.

11. The diaphragm of claim 8 wherein the pattern of coating is applied to a first side of the flexible metallic member and a second pattern of coating is applied to a second side of the flexible metallic member.

12. The diaphragm of claim 8 wherein the pattern of the outer ring generally matches the area where the diaphragm forms a seal with at least one of: the body, and a bonnet.

13. The diaphragm of claim 8 wherein the outer ring has a width that is less than or equal to a width of an area of the valve body that engages the flexible metallic member to substantially eliminate wetting of the outer ring of coating when the diaphragm is used in the flow control device.

14. The diaphragm of claim 8 wherein the outer ring has a width that is less than or equal to a width of an area of a valve bonnet that engages the flexible metallic member to substantially eliminate wetting of the outer ring of coating when the diaphragm is used in the flow control device.

15. A diaphragm for use in a flow control device that includes a body having an inlet port, an outlet port, and a valve seat, the diaphragm comprising:
   a flexible metallic member; and
   a non-metallic coating disposed on the flexible metallic member for sealing an interface between the diaphragm and the body; wherein the coating is disposed on the flexible metallic member in a pattern comprising an outer ring of coating on the flexible metallic member and an uncoated area of the flexible metallic member that extends radially inward from the outer ring;
   wherein the pattern of coating is applied to a first side of the flexible metallic member and a second pattern of coating is applied to a second side of the flexible metallic member;
   wherein the second pattern of coating comprises a second outer ring of coating on the flexible metallic member and a second uncoated area of the flexible metallic member that extends radially inward from the second outer ring.

16. A diaphragm for use in a flow control device that includes a body having an inlet port, an outlet port, and a valve seat, the diaphragm comprising:
   a flexible metallic member; and
   a non-metallic coating disposed on the flexible metallic member for sealing an interface between the diaphragm and the body; wherein the coating is disposed on the flexible metallic member in a pattern comprising an outer ring of coating on the flexible metallic member and an uncoated area of the flexible metallic member that extends radially inward from the outer ring;
   wherein the pattern of coating is applied to a first side of the flexible metallic member and a second pattern of coating is applied to a second side of the flexible metallic member;
   wherein the second pattern of coating comprises an inner ring, a first uncoated area of the flexible metallic member that extends radially inward from the inner ring, and a second uncoated area of the flexible metallic member that extends radially outward from the inner ring.

17. The diaphragm of claim 8 wherein the inner ring has a width that is less than or equal to a width of an area of a valve seat that engages the flexible metallic member to substantially eliminate wetting of the inner ring of coating when the diaphragm is used in the flow control device and the diaphragm is in a closed position.

18. The diaphragm of claim 16 wherein the inner ring has a width that is less than or equal to a width of an area of a valve seat that engages the flexible metallic member to substantially eliminate wetting of the inner ring of coating when the diaphragm is used in the flow control device and the diaphragm is in a closed position.

19. The diaphragm valve of claim 1 valve seat is a separate component that is assembled with the valve body.

20. The diaphragm valve of claim 1 wherein the pattern of coating is applied to a first side of the flexible metallic member and a second pattern of coating is applied to a second side of the flexible metallic member.

21. The diaphragm valve of claim 1 wherein the outer ring has a width that is less than or equal to a width of an area of the valve body that engages the diaphragm to substantially eliminate wetting of the outer ring of coating.

22. The diaphragm valve of claim 1 wherein the outer ring has a width that is less than or equal to a width of an area of a valve bonnet that engages the diaphragm to substantially eliminate wetting of the outer ring of coating.

23. A diaphragm valve comprising:
   a valve body including an inlet port, an outlet port, and a valve seat; and a diaphragm assembled with the valve body, the diaphragm being configured to flex into sealing engagement with the valve seat to inhibit fluid flow from the inlet port to the outlet port and out of sealing engagement with the valve seat to allow fluid flow from the inlet port to the outlet port, the diaphragm including a coating disposed on the diaphragm in a pattern comprising an outer ring of coating on the diaphragm and an uncoated area of the diaphragm that extends radially inward from the outer ring;

wherein the pattern of coating is applied to a first side of the flexible metallic member and a second pattern of coating is applied to a second side of the flexible metallic member;

wherein the second pattern of coating comprises a second outer ring of coating on the diaphragm and a second uncoated area of the diaphragm that extends radially inward from the second outer ring.

24. A diaphragm valve comprising:

a valve body including an inlet port, an outlet port, and a valve seat; and a diaphragm assembled with the valve body, the diaphragm being configured to flex into sealing engagement with the valve seat to inhibit fluid flow from the inlet port to the outlet port and out of sealing engagement with the valve seat to allow fluid flow from the inlet port to the outlet port, the diaphragm including a coating disposed on the diaphragm in a pattern comprising an outer ring of coating on the diaphragm and an uncoated area of the diaphragm that extends radially inward from the outer ring;

wherein the pattern of coating is applied to a first side of the flexible metallic member and a second pattern of coating is applied to a second side of the flexible metallic member;

wherein the second pattern of coating comprises an inner ring, a first uncoated area of the diaphragm that extends radially inward from the inner ring, and a second uncoated area of the diaphragm that extends radially outward from the inner ring.

25. The diaphragm valve of claim 1 wherein the inner ring has a width that is less than or equal to a width of an area of the valve seat that engages the diaphragm to substantially eliminate wetting of the inner ring of coating when the diaphragm is seated against the valve seat.

26. The diaphragm valve of claim 24 wherein the inner ring has a width that is less than or equal to a width of an area of the valve seat that engages the diaphragm to substantially eliminate wetting of the inner ring of coating when the diaphragm is seated against the valve seat.

* * * * *